Nov. 27, 1928. J. A. CAMERON Re. 17,145

PROTECTIVE GUARD FOR WINDING OR OTHER MACHINES

3 Sheets-Sheet 1

Original Filed Dec. 3, 1923

James A. Cameron
INVENTOR.

BY

Wm V Pecken
ATTORNEY.

Nov. 27, 1928. J. A. CAMERON Re. 17,145

PROTECTIVE GUARD FOR WINDING OR OTHER MACHINES

3 Sheets-Sheet 2

Original Filed Dec. 3, 1923

James A Cameron
INVENTOR.

BY

Fred V Beeker
ATTORNEY.

Nov. 27, 1928. J. A. CAMERON Re. 17,145

PROTECTIVE GUARD FOR WINDING OR OTHER MACHINES

Original Filed Dec. 3, 1923 3 Sheets-Sheet 3

James A. Cameron
INVENTOR.

BY

Frederick Beecher
ATTORNEY.

Reissued Nov. 27, 1928. Re. 17,145

UNITED STATES PATENT OFFICE.

JAMES A. CAMERON, OF BROOKLYN, NEW YORK, ASSIGNOR TO CAMERON MACHINE COMPANY, OF BROOKLYN, NEW YORK, A CORPORATION OF NEW YORK.

PROTECTIVE GUARD FOR WINDING OR OTHER MACHINES.

Original No. 1,605,170, dated November 2, 1926, Serial No. 678,336 filed December 3, 1923. Application for reissue filed October 5, 1928. Serial No. 310,652.

This invention relates generally to protecting means for a machine having exposed operating parts and more particularly for a winding or slitting and winding machine for flexible material to the end that the operator may be kept from injury.

In the accompanying drawings the invention is disclosed in several concrete and preferred forms in which:

Fig. 3 is a top plan view of the parts shown at the right hand side of Fig. 2.

Figure 1:
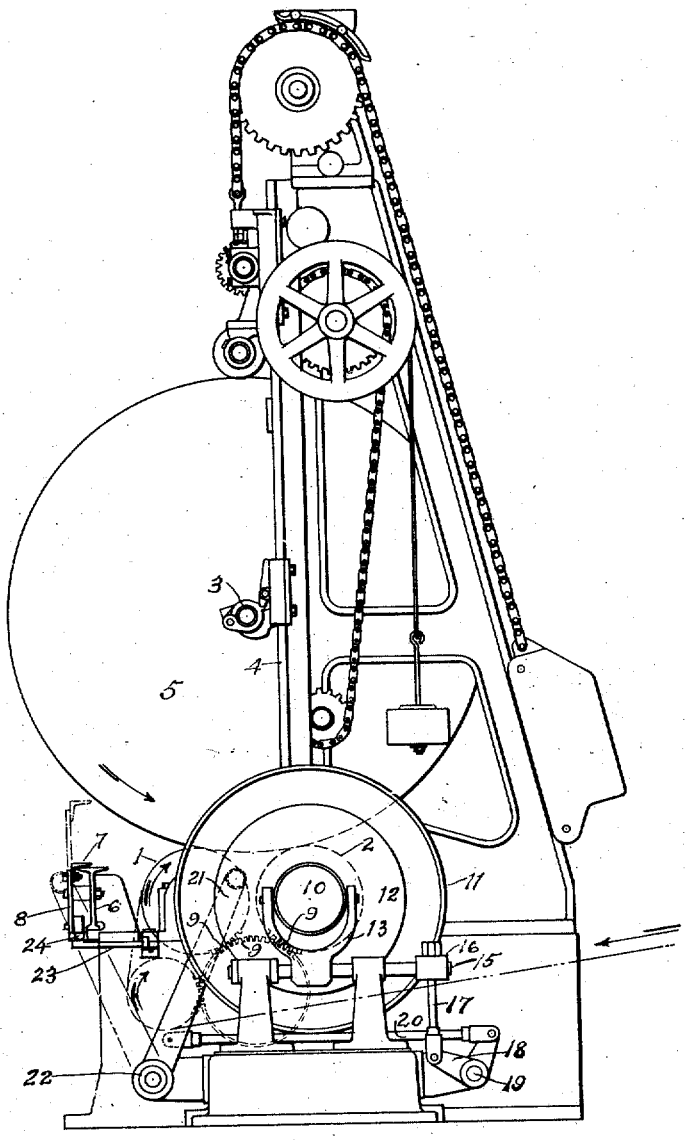
Fig. 1 is an end elevation of a winding machine embodying the invention.
Figure 2:
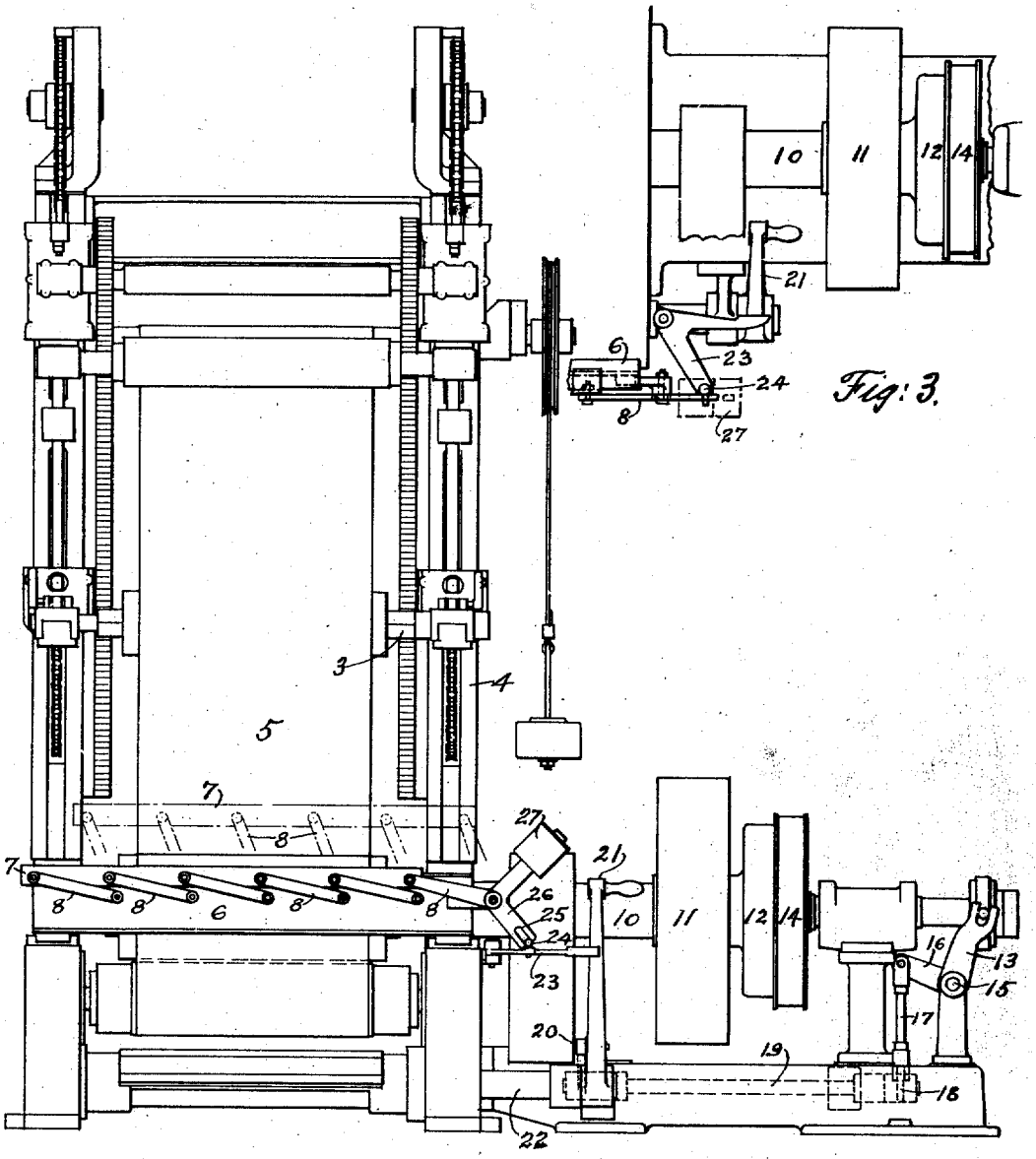
Fig. 2 is a front elevation of the parts shown in Fig. 1.

The machine here selected for illustration of the invention is the well-known Cameron type of winding machine which, in this case, comprises essentially two surface winding drums 1 and 2 and a winding shaft 3 which is displaceable in guides 4 in a manner well understood so as to allow wound material 5 to be accumulated thereon. The wound material in this case rests directly on the winding drums and is driven by friction therefrom. The exposed operating parts here to be protected are the front winding drum 1 and the rewound material, that is, the point of contact or nip between the two rotating members, and the object is to prevent the hand or arm of the operator from being caught and drawn in between the rotating members. The form of the invention shown in Figs. 1 to 3 inclusive comprises a guard consisting of a support 6, a bar 7 and a plurality of parallel links 8 pivotally connected with the support and bar. It will be seen that this guard when in its lowered position, indicated in full lines in Figs. 1 and 2, is ineffective to shield the nip between the rotating members but that when actuated the bar and links form an effective barrier that prevents access to the nip. The raised position of the parts is shown in dotted lines in Figs. 1 and 2. It will also be observed from Fig. 1 that the parts should be so proportioned and arranged that the bar in its raised position does not interfere with the accumulation of material on the winding shaft. Fig. 1 shows the largest diameter, for the machine under consideration, of accumulated material.

It will be understood that the guard may be raised by hand and then locked in position but it is preferred, regardless of the particular guarding means employed, to have interconnection between a clutch, or other device, controlling the drive of the machine, and the guard whereby, when the clutch is thrown in, the guard is raised into effective position.

In the present instance, the drive is mounted upon an extension of rear winding drum 2 and from this winding drum power is transmitted to front winding drum 1 by means of gears 9 or in any other suitable manner. Extension 10 of the rear winding drum receives motion in any suitable manner as by means of pulley 11 and clutch 12, said clutch being controlled by clutch control lever 13 substantially after the fashion disclosed in patent No. 1,465,967 of August 28, 1923. 14 is a brake drum. Clutch control lever 13 is mounted on a rockshaft 15 connected by link 16 with upright rod 17 which latter is connected with one arm by bell crank 18 on shaft 19, the other arm of said bell crank being connected by link 20 with hand lever 21 mounted to rock on center 22. By moving hand lever 21 to the left in Fig. 1, the clutch is thrown in. Pivotally supported on the framework is a bell crank 23 so positioned as to have one of its arms in front of hand lever 21. The other arm of said bell crank has a ball 24 engaging a slot 25 in arm 26 of one of the links 8. It will now be understood that, when hand lever 21 is moved to the left in Fig. 1, not only is the clutch thrown in but, through the connections described, the guard is raised. 27 is a counterweight that assists the operator in overcoming the weight of bar 7 and links 8. Reverse movement of the hand lever uncouples the clutch and lowers the guard. The parts are preferably so constructed and arranged with respect to each other that the clutch can be slightly engaged so as to inch the machine or turn it over slowly for purposes of adjustment or otherwise without moving the guard.

Figure 5:
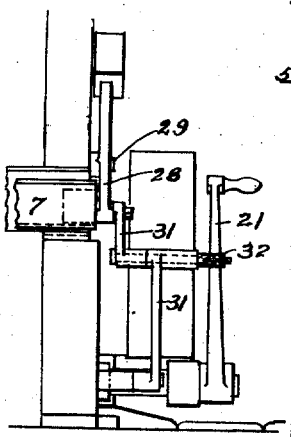
Fig. 5 is a view looking in the direction of arrow 5—5 of Fig. 4.
Figure 4:
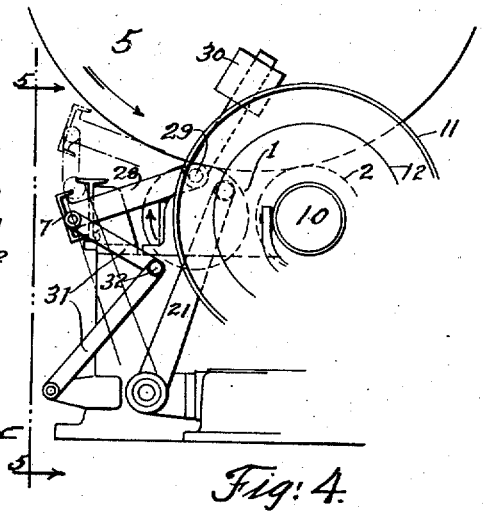
Fig. 4 is a frgamentary view of a modified form of the invention.

In Figs. 4 and 5 bar 7 is carried by two rock arms 28 (only one of which is seen) that are pivotally supported at 29 on the framework and which carry a counterweight 30. 31 is a toggle, one arm of which is pivoted to the framework and the other arm of which is pivotally connected with the outer end of one of the rock arms. It will be seen that when hand lever 21 is moved to the left (in Fig. 4) to throw in the clutch, it engages the toggle at its central point 32 and straightens it, thereby raising the guard.

Figure 6:
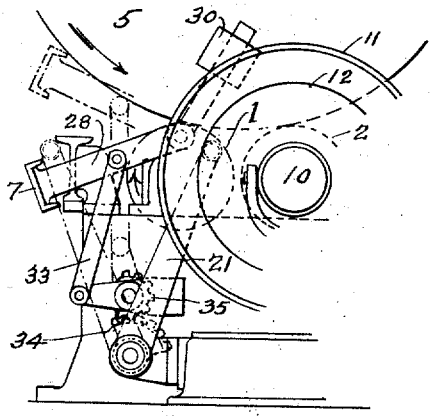

In Fig. 6 rock arms 28 are moved by toggle 33 which in turn is actuated by gear sector 34, moving with hand lever 21, in mesh with gear 35 fast to one of the toggle links.

Figure 7:
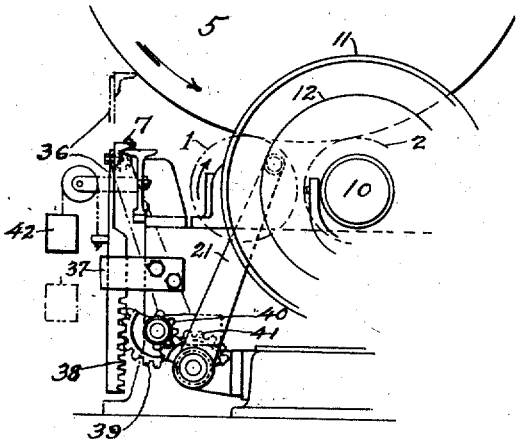
Figs. 6 and 7 are fragmentary views of other modified forms of the invention.

In Fig. 7, bar 7 is carried by two vertically slidable members 36 (only one of which is seen). Members 36 slide in guides 37 and carry racks 38 that are raised and lowered by pinions 39 connected with gear sector 40 which latter receives its motion from gear sector 41 moving with hand lever 21. 42 is a counterweight to assist the operator in raising the device.

I claim:

1. The combination with a surface winding drum and a winding shaft to receive wound material that engages the upper surface of the winding drum, of a support in front of the drum, a bar above the support, a plurality of parallel links pivotally connected with the support and bar, an actuating device to move the links, to raise the bar and thereby to shield the nip between the drum and wound material, driving mechanism to operate said drum, a clutch to control the driving connection between said drum and driving mechanism, and connections between said actuating device and said clutch.

2. The combination with a surface winding drum and a winding shaft to receive wound material that engages the surface of the winding drum, of a movable guard to shield the nip between the drum and wound material but normally ineffective so to do, driving mechanism to operate said drum, a clutch to control the driving connection between said drum and driving mechanism, and connections between said guard and said clutch whereby, on movement of the clutch to throw it in, the guard is moved into effective position.

3. The combination with a surface winding drum and a winding shaft to receive wound material that engages the upper surface of the winding drum, of a support in front of the drum, a bar above the support, a plurality of parallel links pivotally connected with the support and bar, an actuating device to move the links to raise the bar and thereby to shield the nip between the drum and wound material, driving mechanism to operate said drum, means to control the operation of said drum from said driving mechanism, and means associated with said actuating device and said controlling means whereby, on movement of the controlling means to impart motion to the drum, the bar is moved into nip-shielding position.

4. The combination with a surface winding drum and a winding shaft to receive wound material that engages the surface of the winding drum, of a movable guard to shield the nip between the drum and wound material but normally ineffective so to do, driving mechanism to operate said drum, means to control the operation of said drum from said driving mechanism, and means associated with said guard and controlling means whereby, on movement of the controlling means to impart motion to the drum, the guard is moved into effective position.

Signed at New York, in the borough of Brooklyn, county of Kings, and State of New York, this 3 day of October, 1928.

JAMES A. CAMERON.